United States Patent [19]

Schwaig

[11] 4,172,877
[45] Oct. 30, 1979

[54] GLASS LINED CHEMICAL REACTOR

[76] Inventor: Robert H. Schwaig, 6546 Itaska St., St. Louis, Mo. 63109

[21] Appl. No.: 836,308

[22] Filed: Sep. 26, 1977

Related U.S. Application Data

[63] Continuation-in-part of Ser. No. 692,633, Jun. 4, 1976, abandoned.

[51] Int. Cl.$^2$ .............................. B01J 3/04; F28F 3/12
[52] U.S. Cl. .................... 422/205; 422/202; 422/225; 422/241; 165/169
[58] Field of Search ........................... 23/252 A, 290; 220/64 R; 165/109 R, 169; 422/202, 205, 225, 241

[56] References Cited
U.S. PATENT DOCUMENTS

| | | | |
|---|---|---|---|
| 18,220 | 9/1857 | Wood | 165/169 |
| 112,849 | 3/1871 | Roberts | 23/266 X |
| 160,857 | 3/1875 | Walker | 165/169 |
| 1,837,416 | 12/1931 | Ebinger | 165/169 |
| 2,085,924 | 7/1937 | Riegler | 23/290 |
| 2,183,509 | 12/1939 | Smith | 165/169 |
| 2,364,130 | 12/1944 | Clancy | 165/169 |
| 2,420,757 | 5/1947 | Neumann | 165/169 |
| 3,062,685 | 11/1962 | Sanford et al. | 220/64 X |

OTHER PUBLICATIONS

Glascote, (Chemical Equipment), Catalog of Dec. 1, 1925, pp. 1, 2, 4–11, The Glascote Co., Euclid, Ohio.

*Primary Examiner*—Joseph Scovronek
*Assistant Examiner*—Chris Konkol

[57] ABSTRACT

Glass lined reactors for use with chemical reactions which require special conditions such as high temperatures or temperature control. These reactors include an integral baffle which improves the carrying out of such reactions without sacrificing advantages resulting from use of such equipment.

1 Claim, 6 Drawing Figures

U.S. Patent  Oct. 30, 1979  4,172,877
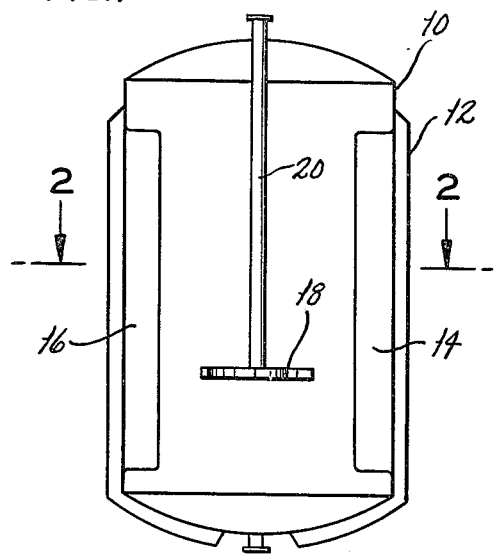
FIG. 1
FIG. 2
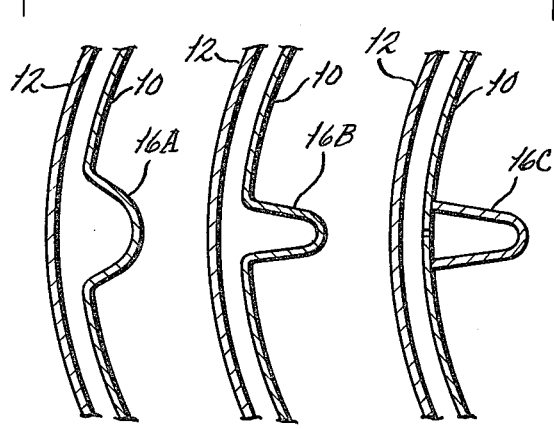
FIG. 3
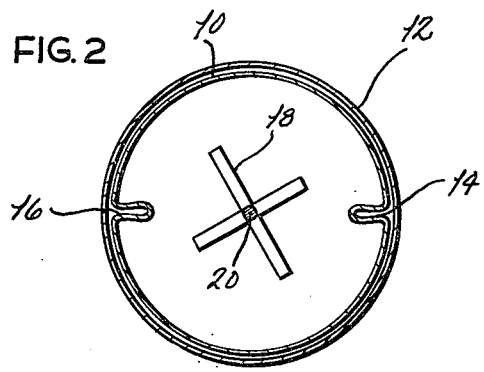
FIG. 4
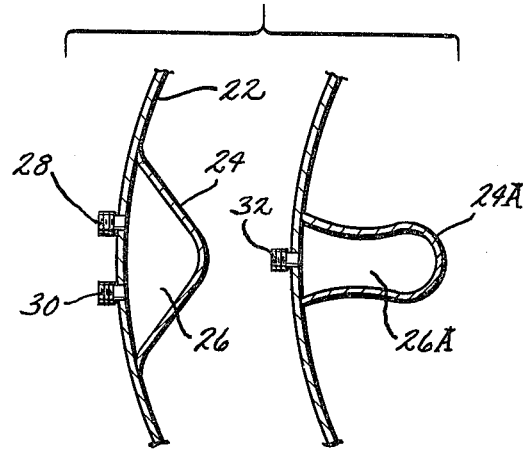
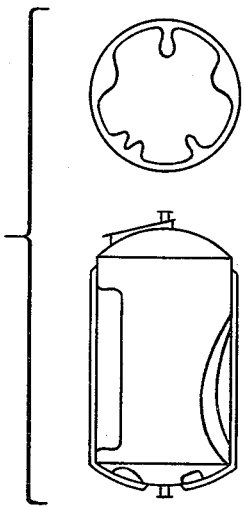
FIG. 5
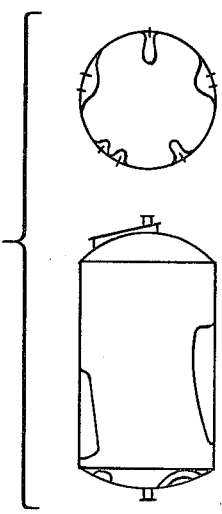
FIG. 6

GLASS LINED CHEMICAL REACTOR

CROSS-REFERENCE TO RELATED APPLICATIONS

This application is a continuation-in-part of application Ser. No. 692,633 filed June 4, 1976, now abandoned.

This invention relates to chemical reactors that are particularly advantageous in carrying out reactions requiring controlled reaction conditions.

Although it has been known for a considerable period of time that certain reactions and processes can particularly advantageously be carried out in vessels which have a glass lining, use of such vessels has rendered difficult auxiliary operations such as agitation and heat transfer. Expedients have been adopted for efficient agitation to mix the contents of the vessel to control reactions occurring therein but they have involved additional components which are not integral parts of the reactor chamber.

Among the objects of the present invention are the provision of glass lined chemical reactors for use in carrying out reactions which require heat transfer and/or agitation control; reactors which provide improved agitation; reactors which eliminate externally supported components; reactors which make possible improved agitation with less power consumption; and reactors which are of more economical construction. The manner in which these and other objects are accomplished will be readily understood by reference to the following detailed description.

In essence, the invention comprises a chemical reactor or vessel having a metal shell provided with an inner glass lining or coating integral and unitary therewith and fused or otherwise firmly affixed thereto, and one or more internally projecting portions which project into the reaction chamber from the side wall and/or bottom portion of the chamber. The projecting portions, which serve as baffles, can be conveniently formed by indentations in the side wall and/or bottom of the chamber. Alternately, the baffles or projections can be formed from separate portions or strips of sheet metal affixed to the internal surface of the reactor shell only at their peripheries with the major portion of the sheet metal separated from the body wall so as to form a space between the reactor shell and the metal strip. Such space is provided with at least one vent through the shell of the reactor.

Regardless of the manner in which the baffles are formed, it is essential for the purposes of the present invention that they together with the shell of the reactor be provided with a continuous glass lining or coating. Thus the present invention provides reactors in which the entire inner surface including the baffles has an exceedingly smooth, glassy coating with a metal backing to insure more uniform heat distribution and strength than could be obtained with glass alone.

Preferred embodiments of the present invention are illustrated in the drawing, in which:

FIG. 1 is a vertical section through a reactor of the present invention;

FIG. 2 is a section taken on line 2—2 in FIG. 1;

FIG. 3 is a group of three alternate forms on an enlarged scale showing the construction of a part of the side panel of the reactor of FIG. 1;

FIG. 4 is a group similar to FIG. 3 but representing portions of a reactor without an outer shell;

FIG. 5 is a composite of several alternate embodiments shown in vertical section and top plan; and FIG. 6 is a composite of still other alternate embodiments shown in vertical section and top plan.

Corresponding reference characters indicate corresponding parts throughout the several views of the drawings.

Referring now to the drawing, a preferred embodiment in FIG. 1 consists of an inner glass lined shell 10 surrounded by an outer shell 12. Shell 10 includes baffles 14 and 16 on either side and a centrally located agitator 18 supported on a shaft 20 which is connected to a source of power, not shown. If desired agitator 18 and shaft 20 may be integral.

As shown in FIG. 3, shell 10 may include baffles 14 and 16 constructed in different configurations, 16A, 16B and 16C. They share the common characteristic that all are formed as part of shell 10 and form an integral portion thereof. Their differing configuration provides different current effects for different reaction conditions.

Also the construction due to pressure requirements in the jacket may require a continuous cylindrical shell as in 16C with the baffle formed separately and then integrally attached—with openings between the entrapped space of the baffle through to the jacket annulus for at least two purposes: (1) to equalize pressure during high-temperature firing of the glass lining, and (2) for the circulation of heat transfer media from the jacket throughout the enclosed space of the integral baffle.

In the past, it has been common procedure to insert into a glass lined reaction tank equipped with an agitator, a non-integral shaft or structure which extends downwardly into the liquid volume of the agitated vessel. This non-integral device functions as a baffle to reduce vortexing during mixing and to aid the effectiveness of the agitation. Since the inserted unit is not integral with the reactor it is less efficient in converting the rotating motion of the mass imparted by the agitator into turbulent and/or axial motion of the reactor contents. It reduces the mixing efficiency beyond what is desired thereby increasing total power consumption compared to that which would be consumed by a similar reacting mass if more efficient agitation were provided.

Such non-integral units have also been utilized to either heat or cool the agitated liquid and here again the resulting structure has been comparatively inefficient and often time costly because the effectiveness of the heat transfer surfaces decreases with an increase in the diameter of the vessel.

The amount of heat transfer surface of such non-integral units is severely limited and the total amount of heat transfer surface available per specific mass invariably decreases as the diameter of the vessel increases.

While FIGS. 1-3 illustrate a vessel having two baffle units it may have a larger number if additional baffling action is needed or additional heat transfer efficiency is required. In all instances, it will be found that agitator 18 will achieve greater agitation with a given power consumption in an integrally baffled vessel than if a non-integral unit or units were employed in a similar vessel. In addition, no supporting hardware is needed as would be required for a non-integral device and there is no requirement for an opening or openings in either the top or bottom head for such devices. Pitched bladed agitators of various speeds of rotation and diameters can be selected to conform to the reaction being carried out and in all instances a savings in the power consumed can be expected while achieving a similar degree of agitation compared to presently utilized impeller and non-integral baffle combinations.

The reactors of the present invention have been described with an outer shell 12 but the advantages adhere to them even when such an outer shell is eliminated and the primary intent for instance may be to achieve heat transfer. Referring now to FIG. 4, two alternate embodiments are illustrated where a reactor 22 without an outer shell has one or more projecting portions 24 and 24A formed thereon. The chamber 26 and 26A formed by said projecting portions may be connected to one or more leads 28, 30 and 32 for circulation of a heating or cooling fluid. Where required for effective reaction purposes, a plurality of such projecting portions may be formed and strategically located to perform the desired heat transfer operation. Instead of a heat transfer fluid the walls of reactor 22 may be formed with portions 24 and 24A as parts thereof leaving areas 26 and 26A open rather than enclosed. In such a reactor without a jacket (outer shell) as such, the projections can also serve as baffles to achieve efficient mixing if such agitation is desired or required for either reaction or heat transfer reasons.

Projections or baffles may be formed in other configurations as shown in FIGS. 5 and 6.

FIGS. 5 and 6 are composites of several alternate embodiments and if a plurality of projections are required on the side wall, they will preferably be similar in geometry one to the other; the side wall baffles may, however, be supplemented by projections on the bottom head—such bottom head baffles if plural will be similar to each other.

As shown in FIG. 6, these projecting portions in a reactor without an outer shell 10 may likewise vary widely where either heat transfer or agitation efficiency is of major importance. The projecting portion is connected to a source of heat transfer fluid and its configuration is varied to achieve a preferred efficiency.

Among the advantages apparent from the foregoing are the improvement in the reaction results with a smaller diameter agitator shaft, a shorter agitator shaft, a smaller speed reducer, a smaller motor, or some combination of these changes, yet achieve the same agitation results with less power and less energy consumed. Initial cost is often reduced as well as operating cost.

In view of the above, it will be seen that the several objects of the invention are achieved and other advantageous results attained.

As various changes can be made without departing from the scope of the present invention, all matter contained herein is illustrative and not limiting.

What is claimed is:

1. A chemical reactor for controlled reaction condition procedures comprising a chamber having a metal side wall, a vertically extending strip of sheet metal projecting into the chamber and affixed only at its periphery to the side wall, the remaining portion of the strip being separated therefrom forming a space between the strip and the side wall, the space being provided with means defining a vent through the side wall, a continuous glass lining integral with the metal wall and strip, and means for agitation projecting into the chamber.

* * * * *